(12) United States Patent (10) Patent No.: US 12,623,180 B2
Nawaz et al. (45) Date of Patent: May 12, 2026

(54) INTENSIFIED CARBON CAPTURE USING BUILDING INFRASTRUCTURE

(71) Applicant: UT-Battelle, LLC, Oak Ridge, TN (US)

(72) Inventors: Kashif Nawaz, Oak Ridge, TN (US); Brian A. Fricke, Oak Ridge, TN (US); Xin Sun, Oak Ridge, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 631 days.

(21) Appl. No.: 17/974,232

(22) Filed: Oct. 26, 2022

(65) Prior Publication Data

US 2023/0130721 A1 Apr. 27, 2023

Related U.S. Application Data

(60) Provisional application No. 63/272,345, filed on Oct. 27, 2021.

(51) Int. Cl.
*B01D 53/14* (2006.01)

(52) U.S. Cl.
CPC ..... *B01D 53/1475* (2013.01); *B01D 53/1425* (2013.01); *B01D 2221/16* (2013.01); *B01D 2252/103* (2013.01)

(58) Field of Classification Search
CPC .............. B01D 53/14; B01D 53/1425; B01D 53/1475; B01D 53/18; B01D 51/10; B01D 53/50; B01D 53/62; B01D 53/96
See application file for complete search history.

(56) References Cited

U.S. PATENT DOCUMENTS

2006/0286011 A1 12/2006 Anttila et al.
2008/0282892 A1 11/2008 Deckman et al.
2018/0345207 A1 12/2018 Custelcean et al.
2020/0368679 A1 * 11/2020 Lefebvre ................ B01D 53/96
2021/0077978 A1 3/2021 Lai et al.
2023/0036635 A1 * 2/2023 Santos-Heard .......... B01J 20/20

* cited by examiner

*Primary Examiner* — Sharon Pregler
(74) *Attorney, Agent, or Firm* — WARNER NORCROSS + JUDD LLP

(57) ABSTRACT

A process for capturing carbon dioxide ($CO_2$) present in a gas stream is provided. The process includes providing a cooling tower that treats a gas stream. The gas stream including $CO_2$ is introduced into the cooling tower. A liquid carbon-dioxide-capturing media is released into the gas stream in the cooling tower. The carbon-dioxide-capturing media absorbs the $CO_2$ in the gas stream, and the carbon-dioxide-capturing media including the absorbed $CO_2$ is collected. An absorber for capture of $CO_2$ in a gas stream is also provided. The absorber includes a cooling tower for treatment of a gas stream including $CO_2$. The cooling tower includes an input for the gas stream, an outlet for a treated gas stream, and a sprayer that releases liquid carbon-dioxide-capturing media into the cooling tower. The carbon-dioxide-capturing media absorbs the $CO_2$ from the gas stream in the cooling tower. A collector collects the carbon-dioxide-capturing media including absorbed $CO_2$.

5 Claims, 5 Drawing Sheets

INTENSIFIED CARBON CAPTURE USING BUILDING INFRASTRUCTURE

CROSS-REFERENCE TO RELATED APPLICATIONS

This application claims the benefit of U.S. Provisional Application No. 63/272,345, filed Oct. 27, 2021, the disclosure of which is incorporated by reference in its entirety.

STATEMENT REGARDING FEDERALLY SPONSORED RESEARCH AND DEVELOPMENT

This invention was made with government support under Contract No. DE-AC05-000R22725 awarded by the U.S. Department of Energy. The government has certain rights in the invention.

FIELD OF THE INVENTION

The present invention relates to a process and apparatus for capturing carbon dioxide present in ambient air and other applications.

BACKGROUND OF THE INVENTION

The level of greenhouse gases (primarily water vapor, carbon dioxide, methane, nitrous oxide, and ozone) in the atmosphere is important due to its effect on Earth's average surface temperature. Increased carbon dioxide ($CO_2$) production and emission in the last 300 years has been one of the largest culprits in the rising level of atmospheric greenhouse gases, which threatens to increase the average surface temperature on Earth. There has been an international effort to limit this increase in average surface temperature to below 2° C. Mitigation of global warming has included use of renewable energy, increase in energy efficiencies, and carbon capture and storage (CCS) of emissions from fossil-fuel power plants and other sources of carbon dioxide emissions. Recently, mitigation efforts have expanded to include removal of carbon dioxide from the atmosphere for storage in geologic reservoirs. These so-called negative emissions technologies (NETs) include carbon dioxide direct air capture (DAC) and bioenergy carbon capture and storage (BECCS).

NETs are considered essential in reducing the concentration of carbon dioxide in the atmosphere. The cost expected for DAC of carbon dioxide, however, is much higher than the cost of CCS because of the low concentration of carbon dioxide in the atmosphere (approximately 400 ppm) compared to that in power plant emissions (approximately 13%). Particularly, BECCS is more economical than DAC because biomass generated during carbon dioxide removal from the atmosphere can be used to produce electricity, thus generating revenue while also reducing the atmospheric concentration of carbon dioxide. A recent study of BECCS including biomass production, transportation to biomass driven power plants, electricity generation, and CCS demonstrated a carbon avoidance cost (CAC) of $40-60 per ton of carbon dioxide which is much lower than the CAC estimated for DAC (>$100 per ton of carbon dioxide). The cost difference is primarily because BECCS produces electricity. Additionally, it has been predicted that by 2040, in the U.S. alone, nearly a billion tons of carbon dioxide may be removed annually from the atmosphere through BECCS.

Biomass can be effectively converted to electricity by either direct combustion or through the integrated gasification combined cycle (IGCC). Both approaches lead to gaseous emissions of relatively high carbon dioxide concentrations compared to that in fossil fuel power plant emissions. Natural gas power plants, for example, produce 5% carbon dioxide emissions, while coal power plants produce 13% carbon dioxide emissions. On the other hand, biomass driven IGCC leads to 33% carbon dioxide emissions, and direct biomass combustion leads to 20% carbon dioxide emissions due to a high carbon-to-hydrogen ratio. The much higher carbon dioxide concentration in biomass-conversion emissions poses some challenges for carbon-dioxide-capture technologies such as BECCS.

For example, the carbon dioxide capture reaction with a sorbent/solvent system is an exothermic equilibrium reaction. As the temperature of the system increases due to the reaction, the equilibrium shifts, which limits the ability of the sorbent to react with carbon dioxide. This phenomenon has been observed in carbon dioxide absorption columns and is expected to become even stronger as the concentration of carbon dioxide increases, such as in the conversion of biomass to electricity. Therefore, there is a significant need to further improve BECCS processes. Additionally, there is a significant need to remove carbon dioxide gas from the environment.

SUMMARY OF THE INVENTION

A process for capturing carbon dioxide ($CO_2$) present in a gas stream is provided. The process includes providing a cooling tower that treats a gas stream. The process further includes introducing the gas stream including $CO_2$ into the cooling tower. The process further includes releasing a liquid carbon-dioxide-capturing media into the gas stream in the cooling tower. The carbon-dioxide-capturing media absorbs the $CO_2$ in the gas stream. The process further includes collecting the carbon-dioxide-capturing media including the absorbed $CO_2$.

In specific embodiments, the process includes loading a contactor material in the cooling tower. The gas stream and liquid carbon-dioxide-capturing media flow through the contactor material in the cooling tower.

In particular embodiments, the contactor material is porous.

In certain embodiments, the contactor material is one of a mesh and a foam.

In particular embodiments, the contactor material is formed of one of a metal, a polymer, a polymer composite, and a ceramic.

In particular embodiments, the contactor material is a continuous structure or formed of a plurality of individual modules.

In particular embodiments, the contactor material has internal channels, and the process further includes feeding a heat exchange fluid through the internal channels to remove a heat of absorption.

In specific embodiments, the process further includes feeding the carbon-dioxide-capturing media including the absorbed carbon dioxide to a regenerator, wherein the carbon-dioxide-capturing media is warmed in the regenerator, thereby releasing the absorbed carbon dioxide and regenerating the carbon-dioxide-capturing media, and collecting the carbon dioxide released from the carbon-dioxide-capturing media in the regenerator.

In particular embodiments, the regenerated carbon-dioxide-capturing media is fed back to the cooling tower.

In particular embodiments, the carbon-dioxide-capturing media is warmed using waste heat.

In certain embodiments, the waste heat is obtained from a source separate from the cooling tower.

In particular embodiments, the regenerator is one of: (i) separate from the cooling tower; and (ii) integrated with the cooling tower.

In specific embodiments, the carbon-dioxide-capturing media is an aqueous-based sorbent.

In specific embodiments, the gas stream flows through the cooling tower by one of: (i) forced draft; (ii) natural draft; and (iii) induced draft.

An absorber for capture of carbon dioxide ($CO_2$) in a gas stream is also provided. The absorber includes a cooling tower for treatment of a gas stream including carbon dioxide. The cooling tower includes an input for the gas stream and an outlet for a treated gas stream. The absorber further includes a sprayer that releases liquid carbon-dioxide-capturing media into the cooling tower. The carbon-dioxide-capturing media absorbs the carbon dioxide from the gas stream in the cooling tower. The absorber further includes a collector that collects the carbon-dioxide-capturing media including absorbed carbon dioxide.

In specific embodiments, the absorber further includes a contactor material loaded in the cooling tower, and the gas stream and liquid carbon-dioxide-capturing media flow through the contactor material in the cooling tower.

In particular embodiments, the contactor material is one or more of: (i) a porous material; (ii) a mesh or foam material; (iii) a metal material; (iv) a polymer material; (v) a polymer composite material; (vi) ceramic material; (vii) a continuous structure; and (viii) formed of a plurality of individual modules.

In specific embodiments, the carbon-dioxide-capturing media is an aqueous-based sorbent.

In specific embodiments, the absorber further includes a regenerator for the carbon-dioxide-capturing material. The regenerator includes an input for the carbon-dioxide-capturing media including absorbed carbon dioxide, an outlet for regenerated carbon-dioxide-capturing media not including carbon dioxide, and an outlet for carbon dioxide released from the carbon-dioxide-capturing media.

In specific embodiments, the cooling tower is one of a cooling tower for a building, a cooling tower for a factory, a cooling tower for a chemical plant, and a cooling tower for a power plant.

DETAILED DESCRIPTION OF THE CURRENT EMBODIMENTS

As discussed herein, the current embodiments relate to an absorber and process for removing carbon dioxide present in a gas stream that effectively manage heat of carbon dioxide absorption to maintain a high rate of carbon dioxide capture. The absorber is integrated into existing cooling towers to leverage the capital infrastructure of commercial buildings, data centers, power plants, and industrial plants. The absorber may be implemented, for example, in bioenergy power plants to capture carbon dioxide from bioenergy flue gas emissions. The absorber also may be used in chemical plants or buildings for the removal of carbon dioxide, in connection with the cooling of waste heat streams. Essentially, the absorber may be used in any application in which a cooling tower is used. Due to its management of heat, the absorber may be up to ten times smaller than a conventional packed column. Consequently, the reduction in equipment size may reduce the capital cost of the absorber by more than 90%, thus reducing the overall cost of carbon dioxide capture by 30-40%.

Figure 1:
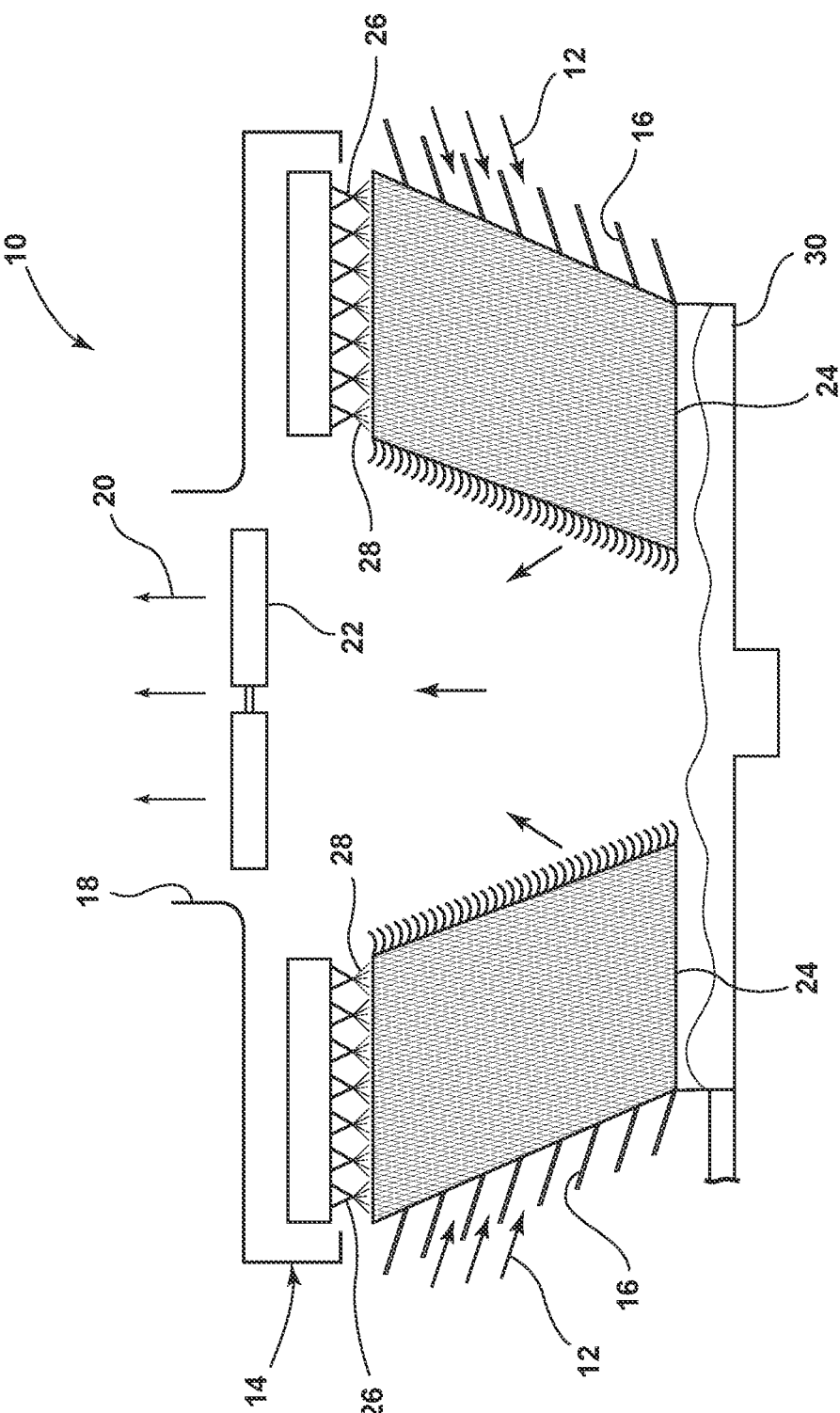
FIG. 1 is a sectional view of an absorber for capturing carbon dioxide in accordance with some embodiments of the disclosure.
Figures 2, 3, 4:
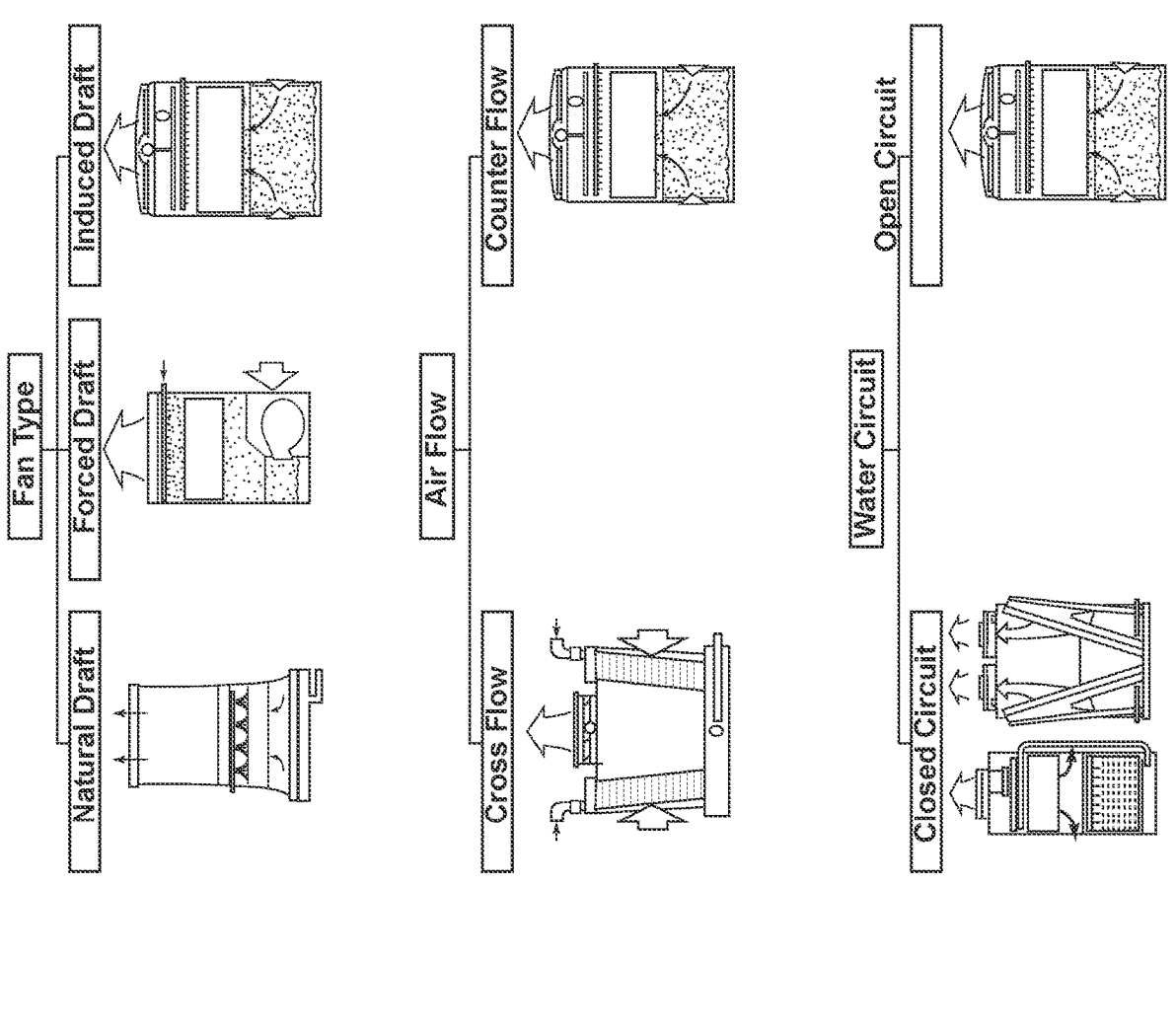
FIG. 2 is a schematic view of draft types of a cooling tower of the absorber.
FIG. 3 is a schematic view of flow direction types of the cooling tower.
FIG. 4 is a schematic view of fluid circuit types of the cooling tower.

More particularly, an absorber 10 for capture of carbon dioxide ($CO_2$) present in a gas stream 12 is integrated into and includes a cooling tower 14 such as shown in FIG. 1. The cooling tower 14 has an inlet 16 for the gas stream 12 and an outlet 18 for a treated gas stream 20. The cooling tower 14 may be a forced draft tower (via a fan or blower 22), an induced draft tower, or natural draft tower (in which a density variation caused by a temperature or concentration differential results in air movement) as known in the art and shown by example in FIG. 2. Further, the cooling tower may be, for example, a cross flow or a counter flow type tower as known in the art and shown by example in FIG. 3. Furthermore, the cooling tower may be, for example, a closed circuit type tower in which the liquid is continuously cycled within the tower, or an open circuit type tower in which the liquid flows through and out of the tower. The cooling tower is not limited in size or capacity, and may vary in size and capacity based on the specific process or application in which the absorber 10 is integrated.

The gas stream may be ambient air obtained from the outside environment, may be air obtained from a commercial or industrial process, may be internal air from inside a building, or may be air that is otherwise treated prior to introduction into the cooling tower. The flow rate, temperature, and moisture content of the gas stream is not particularly limited and may vary depending on the application. Additionally, the carbon dioxide concentration in the gas stream may also vary depending on the source of the gas stream. For example, internal air from inside a building may have a higher concentration of carbon dioxide than the ambient air, or vice versa, depending on the activity inside and outside the building.

Figure 5:
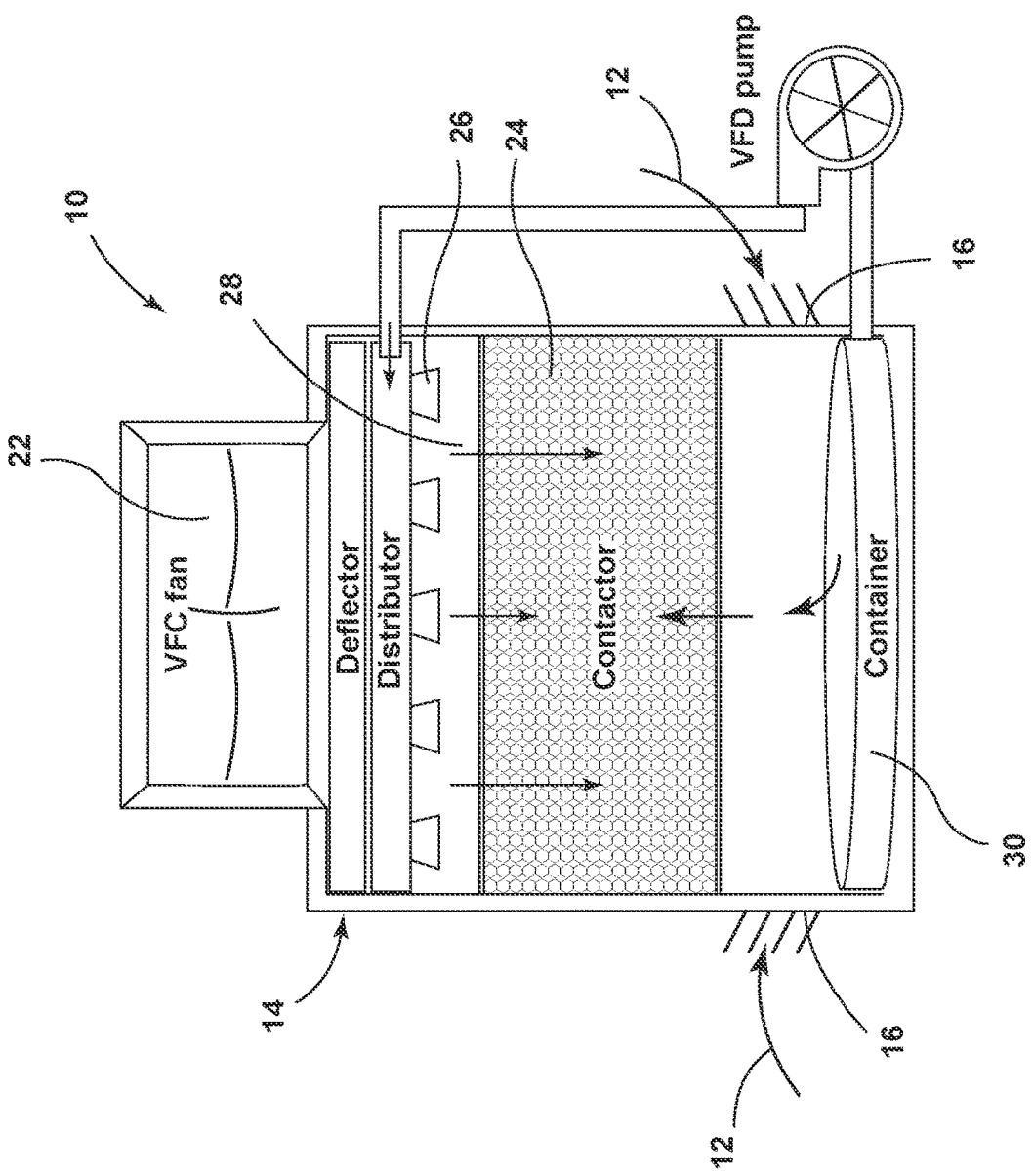
FIG. 5 is a schematic view of the absorber including the cooling tower in accordance with some embodiments of the disclosure.

With reference now to FIGS. 1 and 5, a contactor/contactor material 24 is loaded into the cooling tower 14. However, it should be understood that in certain embodiments the absorber does not include a contactor. The contactor 24 aides in the absorption of carbon dioxide as described in more detail below. Further, the contactor 24 forms a wicking media of the cooling tower for evaporative cooling. The contactor 24 may be, for example, a porous material such as a wire or wire-like mesh, a foam, or similar, and may be formed of (e.g., aluminum, copper, steel, alloys), a polymer or polymer composite (e.g., PLA, Nylon, Teflon with additives), or a ceramic material (e.g., alumina, SiC). The contactor 24 may be thermally conductive or thermally non-conductive. The contactor 24 may have a monolithic construction with structured channels or may have a modular construction with individual modules that each have a flat channel, corrugated, or wavy structure. The contactor 24 may have a relatively large surface area per unit volume and has a range of uniform or non-uniform shapes, geometries, and dimensions, and may be formed by additive manufacturing. For example, the contactor may have a complex geometry and may have a geometry inspired by nature, such as one similar to a termite hill. However, the range of surface are per unit volume and the overall geometry of the contactor may vary in value and complexity. The contactor 24 also may have a shape and geometry that is no uniform and which various along its dimensions. In some embodiments, the contactor 24 is formed of a plurality of modular units and fills a void space in the cooling tower 14 through which the gas stream 12 flows.

One or more sprayers 26 in the form of nozzles or other similar spray devices are disposed in the cooling tower 14 and release a liquid carbon-dioxide-capturing media 28 into the cooling tower in the vicinity of the contactor 24. The liquid carbon-dioxide-capturing media 28 may be an aqueous-based sorbent (i.e, water solution including amines, amino acids, carbonates, and the like) or other ionic solution capable of capturing carbon dioxide and also capable of flowing through the pores and/or channels of the contactor 24. The carbon-dioxide-capturing media 28 also may be of the type in which the absorption of carbon dioxide leads to the generation of particulates in the media as the carbon dioxide is absorbed. The carbon-dioxide-capturing media 28 is not particularly limited and may be any know material that absorbs carbon dioxide present in the gas stream 12 to capture the carbon dioxide. The surface area and geometry of the contactor 24 aide in the contact and interface between the carbon-dioxide-capturing media 28 and the gas stream 12 to maximize the contact between the carbon-dioxide-capturing media and the carbon dioxide present in the gas stream. The flow of the gas stream 12 through the contactor 24 may be parallel to the flow of carbon-dioxide-capturing media 28 ejected by the sprayers 26, may be counter to the flow of carbon-dioxide-capturing media (as shown in FIG. 5), may be a cross flow (approximately perpendicular) relative to the carbon-dioxide-capturing media, or may be a mixed flow that varies between these depending on the location in the absorber 14 (e.g., in some areas the flow is cross, in others it is counter). The flow rate of the gas stream 12 and the carbon-dioxide-capturing media 28 is variable and may be determined based on the capacity of the cooling tower. In alternative embodiments, the contactor is not present and the carbon-dioxide-capturing media 28 may absorb carbon dioxide directly and not via a surface of a contactor.

A collector 30 is disposed at the bottom of the cooling tower 14 and collects the carbon-dioxide-capturing media that has been ejected from the sprayers 26 and that has absorbed carbon dioxide in the cooling tower. The collector 30 may be, for example, a pan, a catch basin, or other similar collection device capable of collecting a downward flow of liquid. In some embodiments, the carbon-dioxide-capturing media may become saturated after one pass through the absorber 14. In other embodiments, the carbon-dioxide-capturing media may be circulated multiple times through the absorber before it becomes saturated and needs to be regenerated (as described below).

The gas stream 12 such as ambient air including carbon dioxide, at a concentration for example of around 400 ppm, is introduced into the cooling tower 14 by natural or induced draft (such that no fan or blower is required), or the gas stream is drawn in by a fan or blower. As the carbon-dioxide-including gas stream 12 enters the cooling tower 14, the sprayers 26 release the liquid carbon-dioxide-capturing media 28 into the gas stream in the vicinity of the contactor 24. The flow of carbon-dioxide-capturing media 28 in relation to the gas stream 12 may be a cross flow, counter flow, parallel flow, or a combination thereof. The gas stream 12 and liquid carbon-dioxide-capturing media 28 flow through the contactor 24 in the cooling tower 14, and the carbon-dioxide-capturing media contacts the gas stream on the contactor (such as in the pores of the contactor), at which point of contact carbon dioxide is absorbed into the carbon-dioxide-capturing media. The carbon-dioxide-capturing media 28 absorbs carbon dioxide as it travels down to the bottom of the cooling tower 14 at which point it is collected by the collector 30. The gas stream 12 travels to the top of the cooling tower 14, at which point the gas stream with significantly reduced carbon dioxide concentration is released into the atmosphere.

Figure 6:
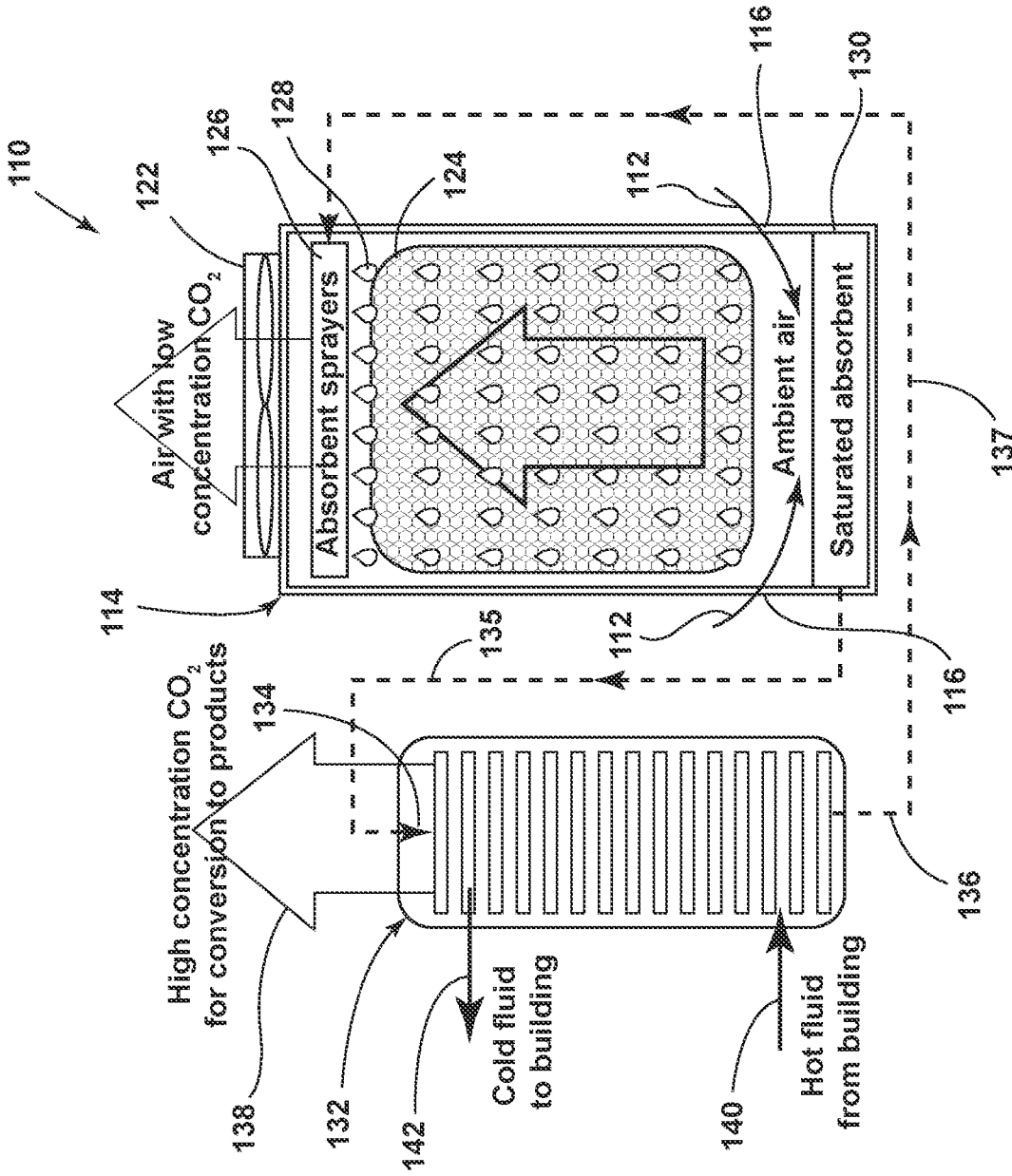
FIG. 6 is a schematic view of the absorber including the cooling tower and a regenerator in accordance with some embodiments of the disclosure.

Turning to FIG. 6, in some embodiments the absorber 110 may further include a regenerator 132 that regenerates the carbon-dioxide-capturing media 128 by releasing the carbon dioxide from the carbon-dioxide-capturing media and collecting the carbon dioxide gas for storage or conversion into other carbon-based products. The regenerator 132 includes an inlet 134 for the carbon-dioxide-capturing media 128 that includes absorbed carbon dioxide. The inlet 134 is connected to the collector 130 of the cooling tower 114 via a pipe or other similar conduit 135. The regenerator 132 also includes an outlet 136 through which regenerated carbon-dioxide-capturing media not including carbon dioxide is returned and fed back to the sprayers 126 of the cooling tower 114 via a pipe or other similar conduit 137. Further, the regenerator 132 includes an outlet 138 for collecting the carbon dioxide released from the carbon-dioxide-capturing media 128. The regenerator 132 includes a heat exchanger or alternatively may comprise a heat exchanger such as a shell and tube heat exchanger, or may be a more complex geometry such as a metal foam material with internal fluid channels running through the foam to provide transfer of heat. The channels also may not be straight. The regenerator 132 also may include the same or similar contactor 124 material as included in the cooling tower 114. The heat required for regeneration of the carbon-dioxide-capturing media 128 may be supplied from a waste heat source such as, but not limited to, waste heat process streams of a building or industrial plant. The regenerator 132 thus may include a waste heat inlet 140 that receives a hot fluid stream from the building or plant, and a waste heat outlet 142 from which the cooled fluid stream returns to the building or plant. The waste heat stream may, for example, be at a temperature in the range of 40 to 50° C. In certain embodiments, if the waste heat stream is a low grade waste stream, a heat pump can be added to the system to increase the temperature of the waste heat stream before use in the regenerator. The waste heat increases the temperature of the saturated carbon-dioxide-capturing media 128 within the regenerator 132, which causes the carbon-dioxide-capturing media to release the absorbed carbon dioxide, and the concentrated carbon dioxide gas released from the carbon-dioxide-capturing material can then be collected via the outlet 138. In other embodiments, the thermal energy may be obtained from solar energy or from a direct heat source, i.e. a heater. As an alternative to using thermal energy, the carbon-dioxide-capturing material may be regenerated using electrical stimuli or pressure differentials.

In some embodiments, the regenerator 132 is integrated with the cooling tower 114 (internally, in which case the heat of regeneration is obtained directly from the heat of the contactor at which carbon dioxide absorption occurs) or may be located in close proximity to the cooling tower such as shown in FIG. 6. In these and other embodiments, the absorber 110 may continuously absorb carbon dioxide in the cooling tower while also simultaneously regenerating the carbon-dioxide-capturing material. However, in yet other embodiments, the regenerator may be separate from the cooling tower, such that the saturated carbon-dioxide-capturing material collected in the cooling tower is fed or otherwise transported to a different location at which the regenerator is present.

In operation of some embodiments as shown in FIG. 6, the cooling tower 114 draws in ambient air through the inlet 116 via the fan 122. The ambient air constitutes the gas stream 112 including carbon dioxide gas. Carbon dioxide gas is removed from the gas stream 112 by activating the sprayers 126 which eject the carbon-dioxide-capturing media 128 into an area of the cooling tower 114 that includes the contactor 124. The gas stream 112 contacts the carbon-dioxide-capturing media 128 via the contactor 124, and the carbon-dioxide-capturing media absorbs the carbon dioxide gas and is subsequently collected below the contactor 124 in the collector 130. At the same time, the ambient air that is drawn into the cooling tower 114 may be used to cool a waste heat stream from a building or other structure or facility with which the cooling tower is associated. Thus, the cooling tower 114 may provide its primary function of cooling a waste heat stream, while also simultaneously removing carbon dioxide gas from the ambient air used in by the cooling tower. Ultimately, a warmer gas stream 120 with a lower concentration of carbon dioxide than the input gas stream 112 exits the cooling tower 114 via the outlet 118. Further, the saturated carbon-dioxide-capturing media 128 collected in the collector 130 is transferred to the inlet 134 of the regenerator 132. In the regenerator 132, the saturated carbon-dioxide-capturing media 128 is warmed, causing the carbon-dioxide-capturing media to release the carbon dioxide which is then collected via the outlet 138. The regenerated carbon-dioxide-capturing material exits the regenerator 132 via the outlet 136 and is recycled back to the cooling tower 114 to the sprayers 126.

Figure 7:
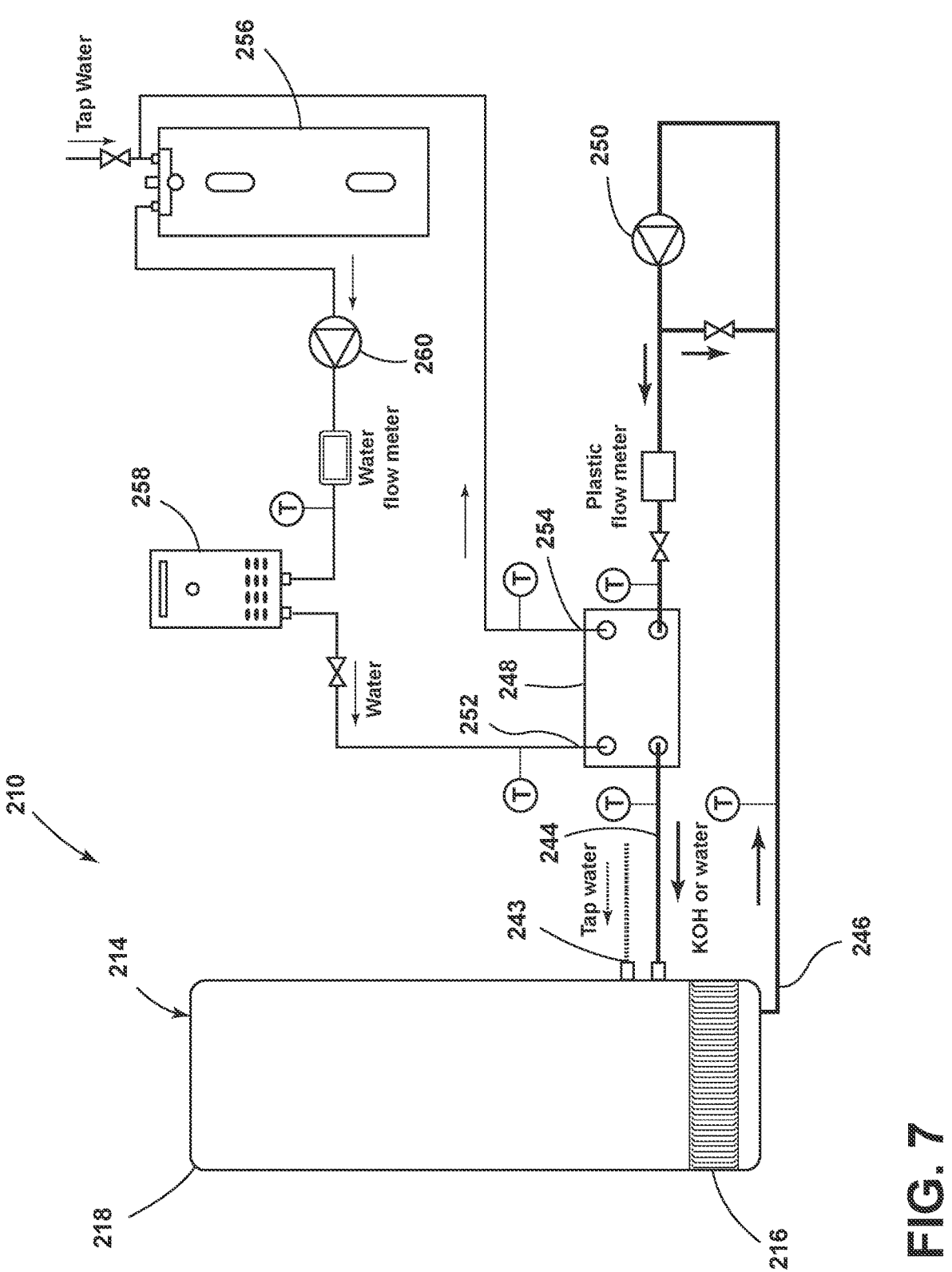
FIG. 7 is a schematic view of an absorber in accordance with specific embodiments of the disclosure.

Turning to FIG. 7, in a specific embodiment the absorber 210 includes a cooling tower 214 having a gas stream inlet 216 and a gas stream outlet 218. Internally, the cooling tower 214 includes a fan, a contactor, sprayers for a carbon-dioxide-capturing media, and a collector such as shown in FIG. 5. The cooling tower 214 includes a water inlet 243. The cooling tower 214 also includes an inlet 244 for receiving the carbon-dioxide-capturing media and an outlet 246 for outflow of the media. The inlet 244 and outlet 246 are connected to a heat exchanger 248 such as a brazed plate heat exchanger or similar and is circulated by a pump 250. The heat exchanger is also connected to a source of hot water. Particularly, the heat exchanger includes a water inlet 252 and a water outlet 254. The water is circulated through a water tank 256 and water heater 258 via a water pump 260. The hot water regenerates the carbon-dioxide-capturing media in the heat exchanger by heating the media and releasing carbon dioxide, and the regenerated media is returned to the cooling tower 214 via the inlet 244.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

What is claimed is:

1. An absorber for capture of carbon dioxide ($CO_2$) present in a gas stream, the absorber comprising:
    a cooling tower for treatment of a gas stream including carbon dioxide, the cooling tower including an input for the gas stream and an outlet for a treated gas stream, the cooling tower being one of a forced draft tower, an induced draft tower, or a natural draft tower;
    a sprayer that releases liquid carbon-dioxide-capturing media into the cooling tower, wherein the liquid carbon-dioxide-capturing media absorbs the carbon dioxide from the gas stream in the cooling tower, and the liquid carbon-dioxide-capturing media is an aqueous-based sorbent solution including an amine, an amino acid, a carbonate, or a combination thereof; and
    a collector that collects the liquid carbon-dioxide-capturing media including absorbed carbon dioxide, the collector being disposed at the bottom of the cooling tower.

2. The absorber of claim 1, including a contactor material loaded in the cooling tower, wherein the gas stream and liquid carbon-dioxide-capturing media flow through the contactor material in the cooling tower.

3. The absorber of claim 2, wherein the contactor material is one or more of: (i) a porous material; (ii) a mesh or foam material; (iii) a metal material; (iv) a polymer material; (v) a polymer composite material; (vi) ceramic material; (vii) a continuous structure; and (viii) formed of a plurality of individual modules.

4. The absorber of claim 1, including a regenerator for the liquid carbon-dioxide-capturing material, wherein the regenerator includes an input for the liquid carbon-dioxide-capturing media including absorbed carbon dioxide, an outlet for regenerated liquid carbon-dioxide-capturing media not including carbon dioxide, and an outlet for carbon dioxide released from the liquid carbon-dioxide-capturing media.

5. The absorber of claim 1, wherein the cooling tower is one of a cooling tower for a building, a cooling tower for a factory, a cooling tower for a chemical plant, and a cooling tower for a power plant.

* * * * *